UNITED STATES PATENT OFFICE.

HENRY HICKS HURT, OF NEW YORK, N. Y., ASSIGNOR TO ROBESON PROCESS COMPANY, OF NEW YORK, N. Y., A CORPORATION OF NEW JERSEY.

PROCESS OF MAKING EMULSIONS AND PRODUCTS THEREOF.

1,201,301.  Specification of Letters Patent.  Patented Oct. 17, 1916.

No Drawing.   Application filed January 27, 1916.  Serial No. 74,687.

*To all whom it may concern:*

Be it known that I, HENRY HICKS HURT, a citizen of the United States, residing at New York, in the county of New York and State of New York, have invented certain new and useful Improvements in Processes of Making Emulsions and Products Thereof, of which the following is a specification.

This invention relates to processes of making emulsions and products thereof; and it comprises a process of making stable and uniform emulsions of oily materials, and most advantageously, of various drying oils and in particular, linseed oil, either raw or boiled, with concentrated sulfite waste liquor preparations, and advantageously dried sulfite waste liquor, wherein the oil and sulfite waste liquor preparations are first well and intimately mixed and are then treated with a small amount, say, about 4 per cent. of the weight of the sulfite waste liquor preparation used, of caustic soda or caustic potash in a concentrated solution in water; and it also comprises as a new article of manufacture a binding composition composed of an oil, very advantageously linseed oil, and dried sulfite waste liquor solids kept in permanent emulsion by the presence of caustic soda; all as more fully hereinafter set forth and as claimed.

In the manufacture of paper pulp by the sulfite process, the sulfite waste liquor forms a byproduct which is concentrated into various preparations useful in tanning, as binders, etc. The thin liquid as it comes from the digester is somewhat unstable but by proper methods of concentration (see Patent 833,634), it can be reduced to a concentrated liquid of 30° Baumé, which is one commercial form, or to dry material. The concentrated liquid material has an extensive use in the arts as a binder for sand cores and like purposes. For this purpose, it is desirable to be able to mingle it with other binders, such as linseed oil, raw or boiled; making composite binders applicable to a wider range of purposes than either of the components separately. But these oils do not readily make good and permanent emulsions with the sulfite liquor preparations. Linseed oil, or an oily composition containing linseed oil, is in extensive use as a core binder, but only for the sharp sands used in fine work such as engine cylinders. It cannot well for various reasons be used with the loamy sands used for other core purposes. The sulfite waste liquor preparations on the other hand work better with the clayey sands. The dried sulfite waste liquor preparations are in a physical form advantageous for shipping and packaging but are not however as useful for making composite binders of this type by the present methods.

The object of the present invention is to provide a cheap, simple and ready method of making permanent and stable emulsions or mixtures of sulfite waste liquor with linseed oil, either raw or boiled; and it is particularly applicable to the stated dried preparations. The linseed oil may be used as such or in admixture with other oils, such as mineral oils, as in the commercial "core oils." These emulsions or mixtures are mainly intended as bonding agents or binders for making cores but may be used as bonding agents in other relations.

I have found that while emulsions of the concentrated liquor and linseed oil are not very stable, and the stability is not much improved by using soda in the original mixture, yet if I first emulsify or thoroughly intermingle the concentrated sulfite waste liquor with the linseed oil and after the mixing or emulsification is effected, I then add a modicum of caustic soda as a concentrated solution and once more stir or agitate well, I secure an emulsion which is stable and has great commercial advantages. Rather unexpectedly I have also found that where instead of using the commercial 30° Baumé sulfite waste liquor, I take the linseed oil and mix it with finely ground, thoroughly dried sulfite waste liquor preparations after the stirring or mixing is complete, if I then stir in the caustic soda, I can secure an emulsion which is also permanent, being as permanent as that obtained with the thick commercial liquor and which is much more concentrated and advantageous commercially. The mixture or emulsion so made is wholly permanent and is particularly advantageous for sand cores and similar purposes. It may be made by the user, thereby taking advantage of the convenient commercial form of the dried sulfite waste liquor solids.

In an advantageous embodiment of my invention making a particularly good type of binder I take, say, 150 parts by weight of linseed oil, either raw or boiled, and stir into it thoroughly 100 parts by weight of dried sulfite waste liquor solids. These should be finely ground. After the incorporation is complete, I then add 100 parts of water containing 4 parts by weight of caustic soda. This addition is in the cold. After the addition of caustic soda and thorough admixture, which may be done by any convenient emulsifying machinery or by hand, a mixture is formed which gives a very strong bond, which is absolutely uniform and which does not separate in time.

Instead of linseed oil, I may use soy bean oil, boiled and oxidized fish oil or other drying oils; but I find linseed oil to be the most desirable oil for my purposes. Instead of caustic soda, I may use caustic potash, or I may, with less advantage, use carbonate of soda. Ammonia has something the same functions, but is not as good nor as cheap. Lime and other alkaline earths are not suitable for my purposes because of their specific action upon sulfite waste liquor, precipitating its solids as insoluble compounds when used to an extent sufficient to make the liquid at all alkaline.

I find that my invention may even be utilized in making permanent emulsions with other oils than the drying oils, although it is particularly adapted to such oils; it being for example possible to make permanent emulsions of mineral oils, such as the heavy oils which are used as road binders by a similar process; a heavy petroleum road oil, for example, being agitated with dry or concentrated sulfite liquor and the emulsion being made permanent by a subsequent addition of caustic soda solution. The emulsions so made are advantageous for many purposes requiring a cheap adhesive or binder, as for instance in surfacing roads, in briqueting coal and ore, and for other purposes.

What I claim is:—

1. The process of making permanent emulsions of oils and sulfite waste liquor preparations which comprises thoroughly intermingling such a preparation and such an oil and after the mingling is complete adding a small amount of caustic soda.

2. The process of making permanent emulsions of drying oils and sulfite waste liquor preparations which comprises thoroughly intermingling such a preparation and such an oil and after the mingling is complete adding a small amount of caustic soda.

3. The process of making permanent emulsions of drying oils and dried sulfite waste liquor preparations which comprises thoroughly intermingling such a preparation and such an oil and after the mingling is complete adding a small amount of caustic soda.

4. The process of making permanent emulsions of linseed oil and sulfite waste liquor preparations which comprises thoroughly intermingling such a preparation and linseed oil and after the mingling is complete adding a small amount of caustic soda.

5. The process of making permanent emulsions of linseed oil and dried sulfite waste liquor preparations which comprises thoroughly intermingling such a preparation and linseed oil and after the mingling is complete adding a small amount of caustic soda.

6. As a new composition of matter, a permanent uniform emulsion of dried sulfite waste liquor solids and linseed oil, kept in emulsion by a modicum of caustic soda.

7. As a new composition of matter, a permanent uniform emulsion of dried sulfite waste liquor solids and an oil, kept in emulsion by a modicum of caustic soda.

HENRY HICKS HURT.